United States Patent Office 3,736,241
Patented May 29, 1973

3,736,241
POLYMERIZATION OF ACRYLONITRILE
Ilie G. Murgulescu, Tatiana Oncescu, and Ion I. Vlagiu, Bucharest, Rumania, assignors to Ministerul Invatamintului, Bucharest, Rumania
No Drawing. Filed Apr. 22, 1970, Ser. No. 30,959
Claims priority, application Rumania, Jan. 4, 1968, 55,558
Int. Cl. C08f 1/16
U.S. Cl. 204—159.22   9 Claims

ABSTRACT OF THE DISCLOSURE

The radiochemical polymerization of acrylonitrile. Such polymerization can be carried out (a) in dimethylsulfoxide, (b) with dimethylsulfoxide in the presence of vinylic monomers and carboxylic groups, or (c) with dimethylsulfoxide in the presence of the oxalic complex manganese diaquodioxolate potassium) generating the oxalic radical. One obtains polymers with good tinctorial qualities, pure and stable under heat and light. The reaction time is four times smaller than for the classical synthesis of this type of polymers. The apparatus required is simple, thereby offering an increased economic advantage. The solution of polymers produced in accordance with the invention may be used, for example, for the spinning of acrylonitrile fibers.

---

The present invention relates to the polymerization of acrylonitrile. More particularly it relates to an improved method of polymerization of acrylonitrile to produce, for example, a solution from which acrylonitrile fibers may be spun.

Prior methods of polymerizing acrylonitrile have required the use of catalysts in order to obtain satisfactory spinning solutions. The polymer thus produced incorporates traces of the catalyst; such catalyst is not only high in cost, but also promotes the degradation of the polymer when it is exposed to the weather. These prior methods involve a reaction process which requires between 27 and 40 hours for its completion.

Broadly, the method of the invention includes the forming of a mixture of acrylonitrile with a liquid medium which promotes the formation of polymer, heating the mixture to a temperature at least moderately above ambient temperature, and subjecting the heated mixture to radiation of short wave length, that is, gamma-ray or X-ray.

More specifically, in accordance with the present invention, acrylonitrile is polymerized, while being subjected to radiation, in dimethylsulfoxide, with dimethylsulfoxide in the presence of vinylic monomers and carboxylic groups, or with dimethylsulfoxide in the presence of the oxalic complex (manganese diaquodioxalate potassium) as a generator of the oxalic radical. Polymerization times are short, a six hour reaction producing, for example, 65% by weight of polymer. In all of these reaction mixtures the amount of dimethylsulfoxide greatly exceeds that of acrylonitrile, in a ratio of about 7 to 1, for example.

The process in accordance with the invention is characterized by the simplicity of its manipulation, and its ability to be incorporated into a flow system. The method of the invention, when employed with the above-described manganate oxalic complex, permits the grafting of carboxyl groups in the macromolecular polymer chain. Such carboxylic (COOH) groups may reach $10^{-4}$–$10^{-5}$ groups of COOH per gram of polymer. The oxalic complex stabilizes the spinning solution.

When hydrazine sulfate is added in an amount of 0.05 to 25% by weight of the solution, the resulting acrylonitrile fibers have a higher degree of white matte. The addition of vinyl toluene in the range 0.5 to 5 parts by weight of the monomer solution, preferably intermediate the period of the polymerization reaction, produces acrylonitrile fibers with improved physical and mechanical properties.

The reaction mixture is subjected to from $5.10^{19}$ ev./gh. of radiation having a wavelength which lies within the gamma- and X-ray portions of the spectrum. The reaction is preferably carried out under nonoxidizing conditions, and at a temperature moderately above ambient temperature, e.g. 50° C. Polymers made employing a mixture of acrylonitrile and dimethylsulfoxide in the ratio of 12/88 in parts by weight, for example, have a viscosity relative to that of acrylonitrile of from 1.52 to 1.80, depending upon the parameters of the reaction.

The following examples describe preferred manners of carrying out the method in accordance with the invention:

EXAMPLE I

A mixture of:

| | Parts by weight |
|---|---|
| Acrylonitrile | 12 |
| Dimethylsulfoxide | 88 | was placed in a reaction ampoule which permitted uniform radiation, was heated to 50° C. in the presence of argon, and was subjected for six hours to gamma or X-ray radiation of a dose strength of $5.10^{19}$ ev./grams per hour.

The reaction was stopped when 65% by weight of the acrylonitrile was converted to a polymer with a molecular weight of 70,000. The polymer had a relative viscosity of 1.60.

EXAMPLE II

A mixture of:

| | Parts by weight |
|---|---|
| Acrylonitrile | 20 |
| Dimethylsulfoxide | 90 |
| Itaconic acid | 0.8 |
| Distilled water | 2.0 | was subjected to the same reaction conditions for the same length of time as in Example I. The polymer produced had a molecular weight of 72,000. The polymer contains acid groups able to fix dyes employed to color the polymer. Maleic and fumaric acid have been used separately and in the same amount as itaconic acid to replace itaconic acid in the method of this example.

EXAMPLE III

A mixture of:

| | Parts by weight |
|---|---|
| Acrylonitrile | 20 |
| Dimethylsulfoxide | 90 |
| Manganese diaquodioxalate potassium | 0.2 |
| Distilled water | 2.0 | was subjected to the same reaction conditions for the same length of time as in Example I. The polymer produced had a molecular weight of 64,000.

EXAMPLE IV

The procedure of Example I was carried out with the same reaction mixture as in Examples I and II with the following exception:

Vinyl toluene, vinyl pyridine, vinyl acetate, methyl methacrylate, isoprene in the range 0.5–6 parts by weight of the solution, acrylonitrile or another monomer was added to the reaction mixture to improve the physical and mechanical properties of the polymer produced.

After 5 hours or at the completion of the polymerization reaction, 0.5–2% by weight of the solution of hydrazine sulfate was added for the stabilization of the spinning solution.

Although the invention is illustrated and described with respect to a plurality of preferred embodiments thereof, it is to be understood that it is in no way limited to the disclosure of such preferred embodiments but is capable of numerous modifications within the scope of the appended claims.

What is claimed is:

1. The method of polymerizing acrylonitrile which comprises forming a mixture of acrylonitrile with dimethylsulfoxide in the presence of manganese diaquodioxalate potassium heating the mixture, and subjecting the heated mixture to ionizing radiation of gamma or X-rays of short wave length in a dose of $5 \times 10^{19}$ ev./g. hrs. at 50° C.

2. The method according to claim 1, wherein the mixture comprises 12–20 parts by weight of acrylonitrile 88–80 parts by weight of dimethylsulfoxide and 0.02–0.2 part by weight manganese diaquodioxalate potassium.

3. The method according to claim 1, wherein the acrylonitrile forms a minor portion and the dimethylsulfoxide forms a major portion of the mixture.

4. The method according to claim 2, wherein the mixture includes a small amount of an organic acid selected from the group consisting of maleic, fumaric, and itaconic acids thereby introducing acid groups able to fix dyes into the macromolecular chain of the polymer.

5. The method according to claim 4, wherein said acid is itaconic acid.

6. The method according to claim 4, wherein said acid is maleic acid.

7. The method according to claim 4, wherein said acid is formic acid.

8. The method according to claim 1 wherein said mixture includes from 0.5 to 6 parts by weight of the mixture of a compound selected from the group consisting of vinyl toluene, isoprene, vinyl pyridine, vinyl acetate, and methyl methacrylate, whereby to improve the physical and mechanical properties of the polymer.

9. The method according to claim 1, comprising adding from .05 to 2.0% by weight of the mixture of hydrazine sulfate intermediate the polymerization to stabilize the solution of the spinning of the fibers therefrom.

References Cited

UNITED STATES PATENTS

| | | | |
|---|---|---|---|
| 3,515,657 | 6/1970 | Nakanome et al. | 204—159.22 |
| 3,525,725 | 8/1970 | Kramer et al. | 260—85.5 D |
| 3,449,286 | 6/1969 | Szita et al. | 260—85.5 D |
| 2,921,006 | 1/1960 | Schmitz et al. | 204—159.15 |

JOHN C. BLEUTGE, Primary Examiner

U.S. Cl. X.R.

204—159.23; 260—85.5 R